United States Patent
Kaler et al.

(10) Patent No.: US 7,092,995 B2
(45) Date of Patent: Aug. 15, 2006

(54) TESTING DISTRIBUTED APPLICATIONS

(75) Inventors: Christopher G. Kaler, Sammamish, WA (US); Luis Felipe Cabrera, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 812 days.

(21) Appl. No.: 10/179,116

(22) Filed: Jun. 25, 2002

(65) Prior Publication Data

US 2003/0236844 A1 Dec. 25, 2003

(51) Int. Cl.
*G06F 15/16* (2006.01)
(52) U.S. Cl. ...................... 709/206; 709/204
(58) Field of Classification Search .......... 709/204, 709/206
See application file for complete search history.

(56) References Cited

U.S. PATENT DOCUMENTS 6,003,079 A * 12/1999 Friedrich et al. ............ 709/224
6,147,998 A * 11/2000 Kelley et al. ............ 370/395.1
6,816,886 B1 * 11/2004 Elvanoglu et al. .......... 709/206

OTHER PUBLICATIONS

An Event Ordering Model for Replaying Message-Based Distributed Systems, Eunjung Lee and Myung-Je Seong, Proceedings of the Communication Networks and Distributed Systems Modeling and Simulation (CNDS'98). 1998 Western MultiConference, Publ. by SCS, San Diego, CA, USA, 1998, pp. 9-14.
Generalized Approach Towards the Fault Diagnosis in any Arbitrarily Connected Network, B. DasGupta, S. DasGupta and A. Chowdhury, High Performance Computing—HiPC'99. 6th International Conference Proceedings, (Lecture Notes in Computer Science), Publ. by Springer-Verlag, Berling, Germany, 1999, vol. 1745, pp. 404-410.

(Continued)

*Primary Examiner*—Rupal Dharia
*Assistant Examiner*—Bradford F. Fritz
(74) *Attorney, Agent, or Firm*—Workman Nydegger

(57) ABSTRACT

Testing information for testing a distributed application is included in messages that are also used by the distributed application to transport data. A test initiator causes test information to be inserted in the header portion or a header element of a message that is being transported across a distributed system. The test initiator may insert test information directly or may cause a message router that receives the message to merge test information into the message. The message, which now includes distributed application data and test information, is routed to a message recipient. The message recipient accesses the message to identify tests that are to be performed at the message recipient. The message recipient performs at least one of the identified tests. Inserting and routing test information, as well as, performing tests may be done in a transport-independent manner.

64 Claims, 5 Drawing Sheets

OTHER PUBLICATIONS

Practical Application and Implementation of Distributed System-Level Diagnosis Theory, R. Bianchini, Jr., K.Goodwin and D.S. Nydick, Digest of Papers. Fault-Tolerant Computing: 20th International Symposium, (Cat. No. 90CH2877-9), Publ. by IEEE Comput. Soc. Press, Los Alamitos, CA, USA, 1990, pp. 332-339.

A Message-Based Fault Diagnosis Procedure, J.R. Agre, Computer Communication Review, USA, Aug. 1986, vol. 16, No. 3, pp. 328-337.

Dynamic Testing Strategy for Distributed Systems, F.J. Meyer and D.K.Pradhan, Fifteenth Annual International Symposium on Fault-Tolerant Computing TCS 15. Digest of Papers. (Cat. No. 85CH2143-6), pp. 84-90.

* cited by examiner

TESTING DISTRIBUTED APPLICATIONS

BACKGROUND OF THE INVENTION

1. The Field of the Invention

The present invention relates to testing distributed applications. More specifically, the present invention relates to systems, methods, and computer-program products for including test information along with distributed application data in messages that are utilized by distributed applications during normal operation.

2. Background and Relevant Art

Computer systems and related technology affect many aspects of society. Indeed, the computer system's ability to process information has transformed the way we live and work. Computer systems now commonly perform a host of tasks (e.g. information management, scheduling, and word processing) that prior to the advent of the computer system were typically performed manually. More recently, computer systems have been coupled to one another to form computer networks over which computer systems may transfer data electronically.

Initially, a significant portion of data transfer on computer networks was performed using specific applications (e.g. electronic mail applications) to transfer data files from one computer system to another. For example, a first user at a first networked computer system could electronically mail a data file document to a second user at a second networked computer system. However, program execution (e.g. running the electronic mail application) and data access (e.g. attaching the data file to an electronic mail message) were essentially completely performed at a single computer system (e.g. at the first computer system). That is, a computer system would execute programs and access data from storage locations contained in the computer system. Thus, being coupled to a network would not inherently give one networked computer system the ability to access data files from another networked computer system. Only after a user actively sends a data file to a computer system could the computer system access the data file.

However more recently, as the availability of higher-speed networks has increased, many computer networks have shifted towards a distributed architecture. Such networks are frequently referred to as distributed systems. Distributed systems function to "distribute" program execution and data access across the modules of a number of different computer systems coupled to a network.

In a distributed system, modules connected to a common network interoperate and communicate between one another in a manner that may be transparent to a user. For example, a user of a client computer system may select an application program icon from a user-interface thereby causing an application program stored at a server computer system to execute. The user-interface may indicate to the user that the application program has executed, but the user may be unaware, and in fact may not care, that the application program was executed at the server computer system. The client computer system and the server computer system may communicate in the background to transfer the user's commands, program responses, and data between the client computer system and the server computer system.

Often, a distributed system includes a substantial number of client computer systems and server computer systems. In many cases, computer systems of a distributed system may function both as client computer systems and server computer systems, providing data and resources to some computer systems and receiving data and resources form other computer systems. Each computer system of a distributed system may include a different configuration of hardware and software modules. For example, computer systems may have different types and quantities of processors, different operating systems, different application programs, and different peripherals. Additionally, the communications path between computer systems of a distributed system may include a number of networking components, such as, for example, firewalls, routers, proxies and gateways. Each networking component may include one or more software or hardware modules that condition and/or format portions of data so as to make them accessible to other modules in the distributed system.

In some cases, "distributed applications" are specifically designed for execution in a distributed system. Due to the number of modules that may be included in a distributed system, properly designing and configuring distributed applications is significantly more complex than designing and configuring applications for execution at single computer system. Each portion of a distributed application, in addition to being configured for proper operation in a stand-alone mode, must also be configured to appropriately communicate with other portions of the distributed application, as well as other modules in associated distributed systems. As such, distributed applications are often tested to help ensure desired operation. Testing may be performed to find and predict the severity of defects (or "bugs") that might cause data corruption or cause modules of the distributed system to crash.

One common testing technique used on distributed applications is to intentionally cause, or "inject," a program fault during program execution. By causing program faults in different modules of a distributed application and under different operating conditions, a tester may be able to determine potential defects in the distributed application. However, even if a tester discovers a defect, there may be no simple way to tell where the defect is occurring. Communication between portions of a distributed application may be transported through any number of network modules (e.g. modules of firewalls, routers, or other computer systems etc.), some outside the tester's control, and any one of which may potentially cause a defect. In some cases, a tester is not even aware of the existence of modules that may potentially cause a defect. This is especially true of distributed applications operating on the Internet, where a number of different entities may control the different modules used to facilitate communication between portions of a distributed application.

To increase the chance of locating modules that are causing a defect, some developers may insert specialized testing code into a distributed application. Other developers may run specialized testing code to modify a distributed application so as to "prepare" the distributed application for testing. Specialized code may cause a distributed application to report test information from different modules of a distributed system back to a tester. Thus, a tester may have a better indication of where a defect is occurring. However, the use of specialized testing code has some inherent problems: specialized testing code is often self-contained and will not interact with other testing programs; and specialized testing code often tests only a small portion of a distributed application's functionality. Specialized testing code may also require specialized environments, thus making it difficult to test "live" data. One of the difficulties in using specialized testing environments is a decreased ability to test timing interactions between different portions of a distributed application. Only in a deployed system can the vast majority of timing interdependencies be tested. In most specialized testing environments, it is not practical to produce all possible timing combinations that may occur.

Since specialized testing code is often incompatible with other testing programs, different versions specialized testing code must be individually developed for different distributed applications. This is time consuming and may require substantially technical expertise on the part of a programmer. Furthermore, reporting test information from different modules of a distributed system back to a tester may consume bandwidth and degrade performance of the distributed system. Thus, time and effort must often be expended to remove specialized testing code from a distributed application before the distributed application is released into production.

Therefore, what are desired are systems, methods, and computer program products, for more efficiently and accurately testing distributed applications.

BRIEF SUMMARY OF THE INVENTION

The principles of the present invention provide for testing distributed applications by including test information along with distributed application data in messages that are utilized by distributed applications during normal operation. The principles of the present invention may be practiced in a distributed system environment that includes a number of message processors (e.g. computer systems, routers, gateways, etc.), each of which may perform message operations (e.g. initiating, accessing, modifying or routing a message) on messages that are transported across the distributed system.

In one example embodiment, a message that originated at a message initiator (e.g. a client computer system) is accessed. Such a message may be a message that includes distributed application data for a distributed application that is currently running on a distributed system. Accessing a message may include accessing data included in the body portion and/or header portion of a message, such as, for example, specific header blocks and/or specific body blocks of a Simple Object Access Protocol ("SOAP") envelope. In some cases, a "test initiator," which may also be a message processor, accesses the message.

Test information that will cause one or more message recipients (e.g. other message processors) to perform the tests indicated by the test information is inserted into the message. In some cases, a test initiator may receive the message and subsequently insert test information into the message. In other cases, a test initiator may send a first message to a message router thereby causing the message router to insert test information into a second message that is received at the message router.

Test information may be inserted in messages that are transported using SOAP. A "test" header may be defined, which includes a test condition attribute, a test frequency attribute, and one or more test action attributes. A message processor (e.g. a test initiator) may cause a test header with the appropriate attributes to be included in a message or may modify existing test headers. In alternate embodiments, test information may be included in other types of messages where information is passed in a standardized manner, such as, for example, a Java-based distributed system.

A test condition attribute may represent a condition that causes a test action to be contingent on the occurrence of an event, for example, that a message processor be experiencing specified load conditions. If the event occurs, the condition is satisfied and the performance of test actions may result. If the event does not occur, the condition is not satisfied and the performance of test actions does not result.

A test frequency attribute may represent the chance of performing a test action after a condition is satisfied. A test frequency attribute may be configured such that a test action is always performed, is performed randomly, or is performed a percentage of the time, when a condition is satisfied.

A test action attribute represents an action that is performed by a message processor to cause one or more messaging operations to affect messages in a manner that may simulate a defect in the message. For example, a message processor may append and remove information from a message so as to randomly garble some portion of the message or tamper with a signed portion of a message.

The message, which now includes test information, is routed to a destination message recipient designated in the message. This may include routing a message to a message processor that is to perform a test indicating by the inserted test information. Thus, test information may "flow" to the message processor where a test action is to be performed.

In a second example embodiment, a message is received at a message router (which may be a message processor). Such a message may include distributed application data associated with a distributed application that is currently operating in the distributed system. The current message router receives test information that will cause one or more message recipients (e.g. other message processors) to perform tests indicated by the test information. Test information may be included in a message (e.g. a SOAP message) that is received from a test initiator. Likewise, computer-readable media containing test information may be maintained at the message router. When a processed message matches specified attach conditions, the message router may receive test information from the computer-readable media.

The message router merges test information into the message. Merging test information may include inserting test information into a header portion of an existing message. The message router may insert test information into an existing test header or may insert a new test header that contains test information. Merging test information into existing messages (e.g. those including distributed application data) allows test information to be expressed without changing a distributed application. In addition, this enables new test information to be added after a distributed application has been written and deployed. Thus improving the testing coverage in response to new deployment environments, new workload characteristics, or new hardware devices. After test information is merged into the message, the message is routed to a destination message recipient designated in the message.

The routed message, which includes distributed application data and test information, is then received at a current message recipient (e.g. a server computer system). The message is accessed by the current message recipient to identify potential tests to be performed at the current message recipient. This may include the current message recipient processing test information, such as, for example, test headers, to identify conditions and frequencies that indicate test actions should be performed. At least one of the potential tests is performed at the current message recipient. This may include performing a test action (e.g. garbling a message) associated with processed test conditions and test frequencies that indicated test actions should be performed. The message is then routed to a destination message recipient designated in the message. This may include routing a message to another message processor that is to perform tests indicated in the message.

By including test information in messages that are already in use by distributed applications, testing is essentially "built into" an existing messaging infrastructure. Thus, distributed application developers are relieved from having to design and implement specialized code to test distributed applications. Further, test information is extensible, thus allowing third parties to develop tests for future arising test situations. This may significantly reduce the labor and monetary costs of developing and testing distributed applications. Further, since test information is included in existing messages, testing a distributed application has a reduced impact on the performance of distributed systems associated with the distributed application.

Additional features and advantages of the invention will be set forth in the description that follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Figure 1:
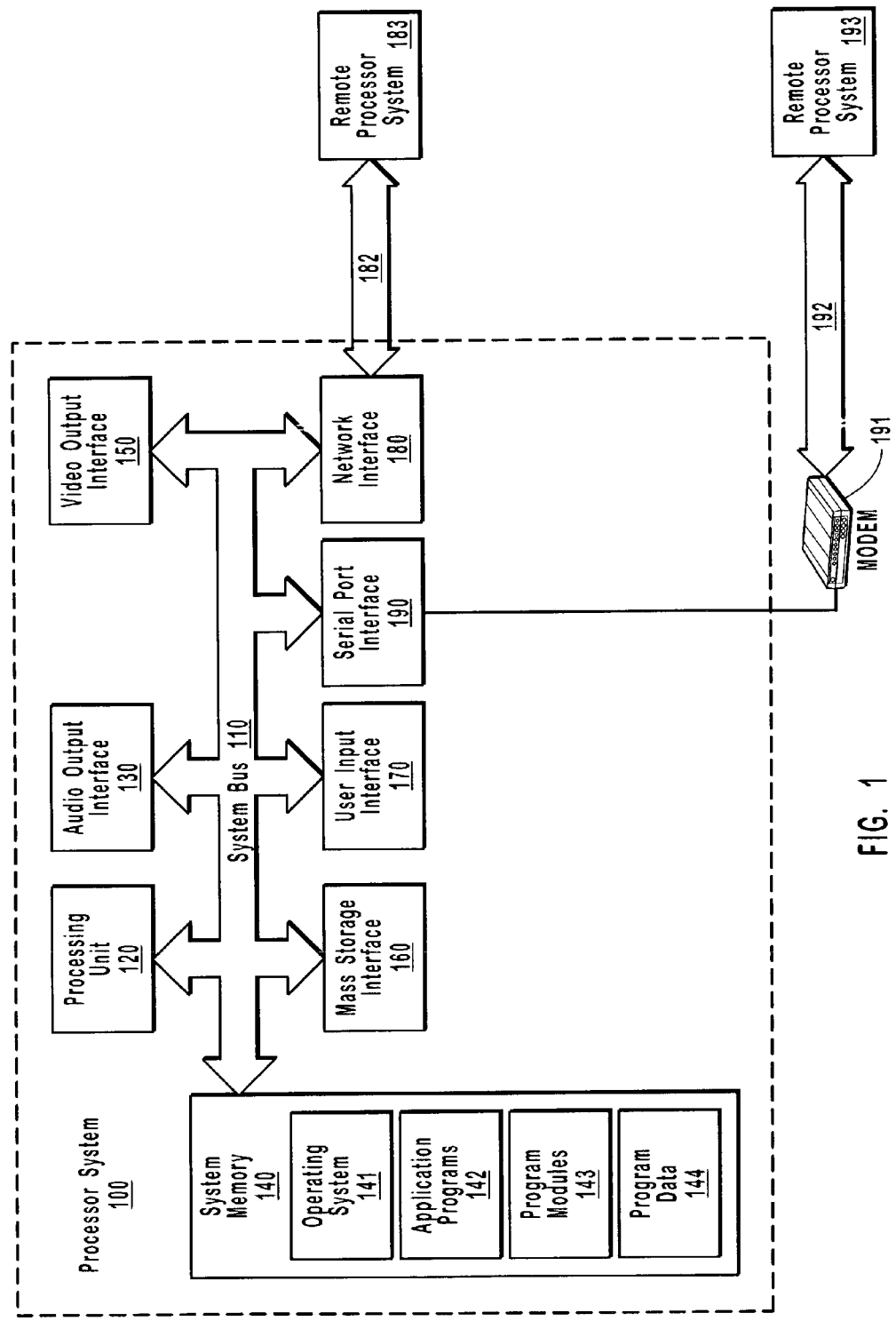
FIG. 1 illustrates an example of a processor system that provides a suitable operating environment for the present invention.

The present invention extends to systems, methods, and computer program products for testing distributed applications by including test information along with distributed application data in messages that are utilized by distributed applications during normal operation. Messages associated with distributed applications may be transported between the message processors of a distributed system. One or more of the message processors may insert test information into a message that may cause other message processors to perform tests. Such tests may include removing information from or appending information to a message to make it appear to a distributed application that an error has occurred during transport of the message.

The embodiments of the present invention may comprise a general-purpose or special-purpose computer system including various computer hardware components, which are discussed in greater detail below. Embodiments within the scope of the present invention also include computer-readable media for carrying or having computer-executable instructions, computer-readable instructions, or data structures stored thereon. Such computer-readable media may be any available media, which is accessible by a general-purpose or special-purpose computer system.

By way of example, and not limitation, such computer-readable media can comprise physical storage media such as RAM, ROM, EPROM, CD-ROM or other optical disk storage, magnetic disk storage or other magnetic storage devices, or any other media which can be used to carry or store desired program code means in the form of computer-executable instructions, computer-readable instructions, or data structures and which may be accessed by a general-purpose or special-purpose computer system.

In this description and in the following claims, a "network" is defined as any architecture where two or more computer systems may exchange data with each other. When information is transferred or provided over a network or another communications connection (either hardwired, wireless, or a combination of hardwired or wireless) to a computer system or computer device, the connection is properly viewed as a computer-readable medium. Thus, any such connection is properly termed a computer-readable medium. Combinations of the above should also be included within the scope of computer-readable media. Computer-executable instructions comprise, for example, instructions and data which cause a general-purpose computer system or special-purpose computer system to perform a certain function or group of functions.

In this description and in the following claims, a "computer system" is defined as one or more software modules, one or more hardware modules, or combinations thereof, that work together to perform operations on electronic data. For example, the definition of computer system includes the hardware components of a personal computer, as well as software modules, such as the operating system of the personal computer. The physical layout of the modules is not important. A computer system may include one or more computers coupled via a computer network. Likewise, a computer system may include a single physical device (such as a mobile phone or Personal Digital Assistant "PDA") where internal modules (such as a memory and processor) work together to perform operations on electronic data.

Those skilled in the art will appreciate that the invention may be practiced in network computing environments with many types of computer system configurations, including routers, gateways, firewalls, proxies, personal computers, laptop computers, hand-held devices, multi-processor systems, microprocessor-based or programmable consumer electronics, network PCs, minicomputers, mainframe computers, mobile telephones, PDAs, pagers, and the like. The invention may also be practiced in distributed system environments where local and remote computer systems, which are linked (either by hardwired links, wireless links, or by a combination of hardwired or wireless links) through a communication network, both perform tasks. In a distributed system environment, program modules may be located in both local and remote memory storage devices.

In this description and in the following claims, a "message processor" is defined as one or more modules (hardware and/or software) that operate together to perform one or more messaging operations on messages that are transported in a distributed system. Messaging operations may include, for example, initiating a message, accessing a message, appending information to a message, sending a message, receiving a message, routing a message, removing information from a message, and terminating a message. Each message processor in a distributed system may include the functionality to perform any of the messaging operations.

In this description and in the following claims, a message processor may be referred to by a particular messaging operation, such as, for example, "initiating", "receiving", and so forth, that is performed at the message processor. When such references are made, a descriptive term representing the particular messaging operation may be substituted for the word "processor", such as, for example, message "router," message "recipient," message "initiator", and so forth, when describing the message processor. This is for descriptive purposes only so as to help distinguish between multiple message processors that may be acting together in a given context. However, this is not meant to imply that a message processor is limited to only the referenced messaging operation used to describe the message processor.

Initiating a message may include generating data for the body and/or header portion of a message. Accessing a message may include processing data included in the body and/or header portion of a message. Appending data to a message may include inserting and/or merging data into the body and/or header portion of a message.

Routing a message includes sending, receiving, and/or determining where to send a message. For example, a message router may "route" a message from a sending message processor to a receiving message processor. The message router may receive the message from the sending message processor, access addressing information from the header portion of the message, and subsequently send the message to the receiving message processor. A message router may also route a message to itself. That is, a message router may determine that a message should be sent to the message router.

Removing data from a message includes removing data from the body and/or header portion of a message. Terminating a message includes removing the message from the distributed system.

In this description and in the following claims, reference may be made to a "test initiator." It should be understood that a test initiator is a message processor and may include the functionality to perform any messaging operations. A test initiator causes tests to be performed in the distributed system.

In this description and in the following claims, a "testing agent" is defined as a module that processes test information and may be included in a message processor. For example, a testing agent may identify if certain test conditions are met, determine associated test frequencies, and perform associated test actions. A testing agent may also determine, based on testing timing conditions and attach conditions, when testing information should be inserted or merged into a message.

In this description and in the following claims, a "logical communication link" is defined as any communication link that enables the transport of electronic data between two message processors. The actual physical representation of a communication path between two entities is not important and may change over time. A logical communication link may include portions of a system bus, a local area network, a wide area network, the Internet, combinations thereof, or portions of any other paths that facilitates the transport of electronic data. Logical communication links can include hardwired links, wireless links, or a combination of hardwired links and wireless links. In the description of the figures that follow, a logical communication link is represented by an arrow or a solid line. It should be understood that a logical communication link can include any number of message processors, such as, for example, proxies, routers, firewalls, gateways, or computer systems. However to simplify the description, these message processors may not be shown. Logical communication links may also include portions of a Virtual Private Network ("VPN").

FIG. 1 and the following discussion are intended to provide a brief, general description of a suitable computing environment in which the invention may be implemented. Although not required, the invention will be described in the general context of computer-executable instructions, such as program modules, being executed by computer systems. Generally, program modules include routines, programs, objects, components, data structures, and the like, which perform particular tasks or implement particular abstract data types. Computer-executable instructions, associated data structures, and program modules represent examples of the program code means for executing steps of the methods disclosed herein. The particular sequences of such executable instructions or associated data structures represent examples of corresponding acts for implementing the functions described in such steps.

With reference to FIG. 1, a suitable operating environment for the principles of the invention includes a general-purpose computer system in the form of a processor system 100. Processor system 100 may be a message processor that has been adapted to perform the operations disclosed herein.

Processor system 100 includes a user input interface 170 that receives information from an input device, such as, for example, a keyboard, microphone, or mouse. An input device can be coupled to user input interface 170 so as to enable the entry of information. An input device may transfer information over such a coupling in response to preprogrammed data or user manipulation of the input device.

Processor system 100 includes a video output interface 150 that provides a video output signal to external video display devices. Processor system 100 may be integrally positioned with or separate from a video display device, such as, for example, a color or monochrome computer monitor. A video display device can be coupled to video output interface 150 so as to receive a provided video output signal.

Similarly, processor system 100 includes an audio output interface 130 that provides an audio output signal to external audio output devices. Processor system 100 may also be integrally positioned with or separate from an audio system, which may include a speaker or other device capable of emitting sound data. An audio system can be coupled to audio output interface 130 so as to receive a provided audio output signal.

Processor system 100 includes processing unit 120, which allows for complex and flexible general-purpose processing capabilities. Processing unit 120 executes computer-executable instructions designed to implement features of processor system 100, including features of the present invention. Processing unit 120 is coupled to system bus 110, which also interconnects various other system components, including system memory 140.

System memory 140 generally represents a wide variety of volatile and/or non-volatile memories and may include types of memory previously discussed. However, the particular type of memory used in processor system 100 is not important to the present invention. Program code means comprising one or more program modules may be stored in system memory 140. The one or more program modules may include an operating system 141, one or more application programs 142, other program modules 143, and program data 144.

Processor system 100 may include mass storage interface 160, which can read data from and/or write data to a mass storage device, such as, for example, a magnetic disk storage device or optical disk storage device. A mass storage device can be coupled to mass storage interface 160 so as to enable the reading and writing of data. When a mass storage device is coupled to mass storage interface 160, one or more program modules including operating system 141, application programs 142, other program modules 143, and program data 144 may be stored in the mass storage device.

Processor system 100 may be network connectable to networks, such as, for example, an office-wide or enterprise-wide computer network, an intranet and/or the Internet. Processor system 100 may exchange data with external sources, such as, for example, remote processor systems and/or databases over such a network.

Processor system 100 includes network interface 180, through which processor system 100 receives data from external sources and/or transmits data to external sources. As illustrated in FIG. 1, network interface 180 facilitates the exchange of data with remote processor system 183 via logical communication link 182. Logical communication link 182 represents a portion of a network, and remote processor system 183 represents a node of the network.

Likewise, processor system 100 includes serial port interface 190, through which processor system 100 receives data from external sources and/or transmits data to external sources. Serial port interface 190 is coupled to modem 191, through which processor system 100 receives data from and/or transmits data to external sources. As illustrated in FIG. 1, serial port interface 190 and modem 191 facilitate the exchange of data with remote processor system 193 via logical communication link 192. Logical communication link 192 represents a portion of a network, and remote processor system 193 represents a node of the network.

Alternatively, the exchange of data with external sources may be facilitated by other interfaces, such as, for example, a parallel port, a game port or a universal serial bus ("USB").

It should be understood that the illustrated network connections are merely examples. It would be apparent to one skilled in the art, after having reviewed this description, that a wide variety of network connection techniques may be used to facilitate the exchange of data between processor system 100 and external sources.

While FIG. 1 represents a suitable operating environment for the present invention, the principles of the present invention may be employed in any system that is capable of, with suitable modification if necessary, implementing the principles of the present invention. The environment illustrated in FIG. 1 is illustrative only and by no means represents even a small portion of the wide variety of environments in which the principles of the present invention may be implemented.

In accordance with the present invention, message processor modules and testing agent modules as well as associated data, including test information may be stored and accessed from any of the computer-readable media associated with processor system 100. For example, portions of such modules and portions of associated program data may be included in operating system 141, application programs 142, program modules 143 and/or program data 144, for storage in system memory 140. If a mass storage device is coupled to processor system 100, such modules and associated program data may also be stored in the mass storage device.

In a networked environment, program modules depicted relative to processor system 100, or portions thereof, can be stored in remote memory storage devices, such as, for example, system memory and/or mass storage devices associated with remote processor system 183 and/or remote processor system 193. Execution of such modules may be performed in a distributed environment as previously described.

Figure 2:
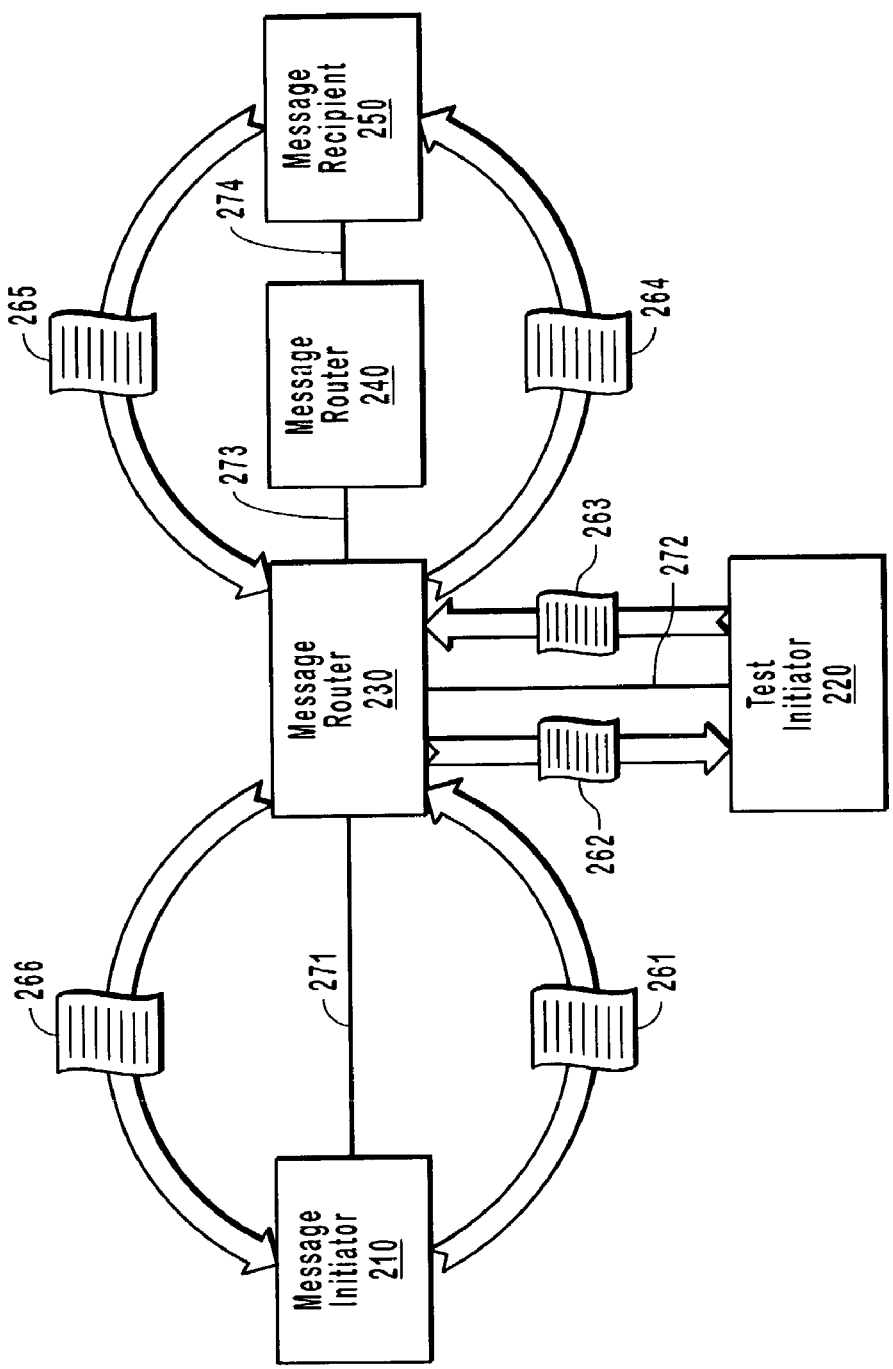
FIG. 2 illustrates an example of some of the functional components that facilitate testing a distributed application by including test information in messages.

FIG. 2 illustrates some of the functional components that can facilitate testing a distributed application by including test information along with distributed application data in messages. FIG. 2 includes message initiator 210, test initiator 220, message router 230, message router 240, and message recipient 250, which are each message processors. FIG. 2 also includes messages 261 thru 266 that may be passed between the illustrated message processors.

A message can include a header portion and a body portion. The body portion of a message may contain actual distributed application data that is being transported between different portions of a distributed application. The header portion of a message may include one or more header blocks containing control information. Control information designates how data in the body portion of a message should be processed. Control information can be used to designate, for example, that the body portion of a message is encrypted, that the body portion of a message is subject to specified security policies, or that a message should be routed in a specified manner. When a message processor receives a message, the message processor may determine what operations it should perform on the message based on the control information. For example, when a message processor is the ultimate message recipient of the body portion of a message, the message processor may decrypt the data in the body portion of the message. However, when a message processor is an intermediary, the message processor may simply route the message to an appropriate destination.

Figure 3:
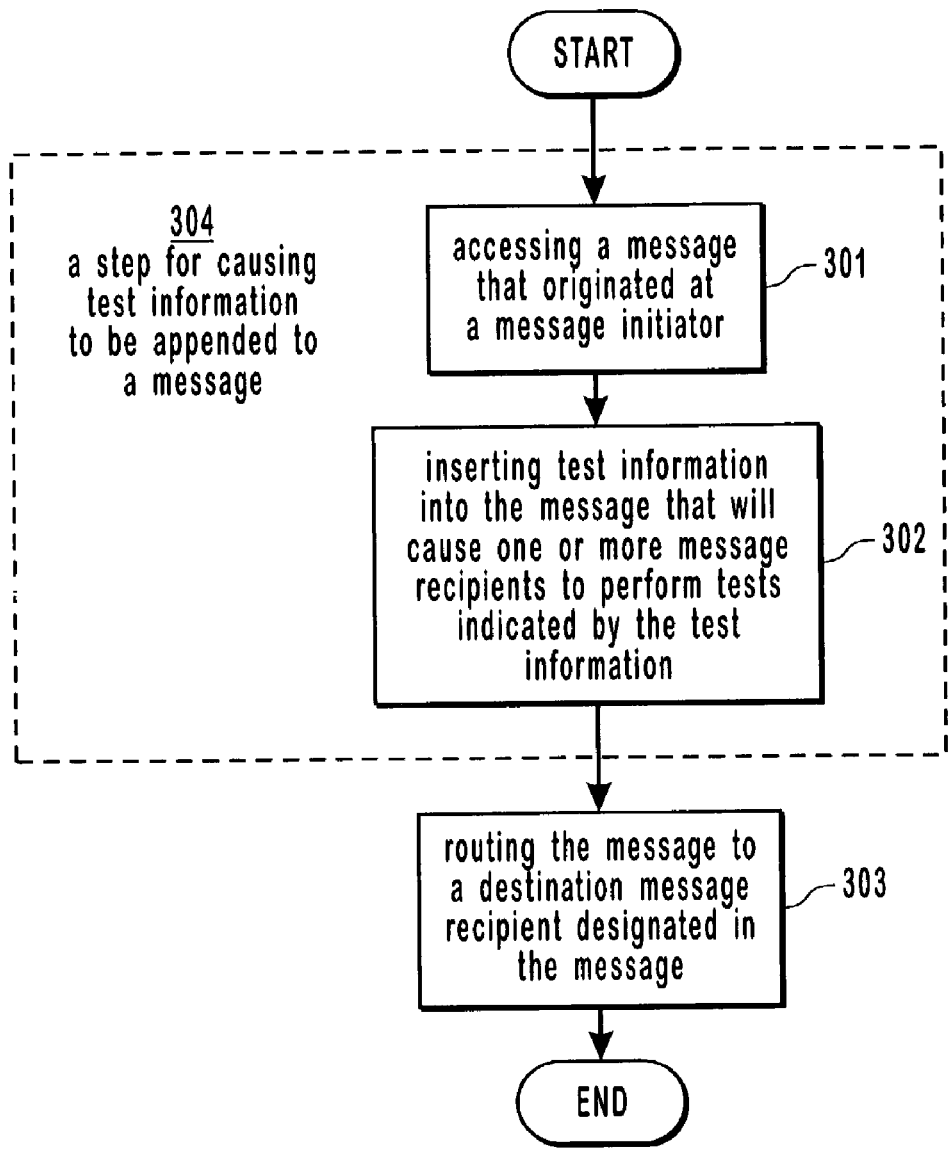
FIG. 3 is a flow diagram illustrating an example of a method for causing test information to be inserted into a message.

FIG. 3 is a flow diagram illustrating an example of a method for causing test information to be inserted into a message. The method of FIG. 3 will be discussed with reference to the functional components of FIG. 2.

The method in FIG. 3 begins with a functional, result-oriented step for causing test information to be appended to a message (step 304). Step 304 may be performed so as to include the testing information along with distributed application data in the message. Step 304 may include any corresponding acts for accomplishing the result of causing test information to be appended to a message. However, in the illustrated example of FIG. 3, the step 304 includes a corresponding act of accessing a message that originated at a message initiator (act 301). Referring to FIG. 2, message initiator 210 initiates message 261 and then routes message 261 to message router 230 via logical communication link 271. Message 261 may be initiated when a portion of a distributed application running at message initiator 210 attempts to communicate with a portion of the distributed application running at another message processor (e.g. message recipient 250).

Test initiator 220 may access message 261 when it is at message router 230. In that case, test initiator 220 sends message 263 to message router 230 to gain access to message 261. Message 263 may include instructions on how message router 230 should process message 261. Message router 230 may follow the instructions included in message 263 to access data included in the body portion and/or the header portion of message 261. In one example embodiment (not shown), message initiator 210 and test initiator 220 are the same message processor. Message initiator 210 sends instructions to message router 230 on how message 261 should be processed.

Step 304 includes a corresponding act of inserting test information into a message that will cause one or more message recipients to perform tests indicated by the test information (act 302). In addition to causing message router 230 to access message 261, the instructions included in message 263 may also cause message router 230 to insert test information into message 261. Test information can be inserted into a message without affecting distributed application data contained in the message and may take the form of control information that is included in the header portion of a message. Test information may be contained in a "test" header that is inserted into message 261.

It should be understood that the present invention is not limited to messaging using any specific transport protocol and format. However, one example protocol that may be used to implement the principles of the present invention is called Simple Object Access Protocol ("SOAP"). The following is an example structure in which the test information is included in a unique "<Test>" header within a Simple Object Access Protocol (SOAP) envelope:

```
1.    <Envelope>
2.       <Header>
         .
         .
         .
3.          <Test>
4.             TEST INFORMATION
5.          </Test>
         .
         .
         .
6.       </Header>
7.       <Body>
8.             DISTRIBUTED APPLICATION DATA
9.       </Body>
10. </Envelope>
```

In this example, the test information may include one or more free-form extensible Markup Language (XML) documents. While using the test header in the header portion of a SOAP envelope allows for the test information to be transported in HyperText Transport Protocol (HTTP) in this example, the test portion of a message may be provided using other mechanisms as well. There is no requirement that the test portion of a message be implemented in the context of a SOAP envelope, or that test information include an XML document. The present invention can be practiced in virtually any messaging system where test information is added to messages to extend the behavior of the messaging system. Test information can include computer-executable instructions, computer-readable instructions, and/or scripts, such as, for example, Java applets, Java scripts, and/or Java derived language statements, that are embedded in a message. Invoking embedded instructions, applets, or scripts can cause tests to be performed. Test information may be included in messages that are transported using Remote Method Invocation ("RMI") protocols, in a Common Object Request Broker Architecture ("CORBA") environment, or in a Common Language Runtime ("CLR") environment.

In one illustrative example, the test information includes test conditions, test frequencies, test timing alternatives, and test actions. If test information is included in XML documents, this may take the form of test condition attributes, test frequency attributes, and test action attributes being associated with a <Test> header.

A test condition represents a condition that causes a test action to be contingent on the occurrence of an event. Such test conditions may be, for example, that a message processor be experiencing specified load conditions or receive a message that has taken a specified number of hops. If the event occurs, the condition is satisfied and the performance of test actions may result. If the event does not occur, the condition is not satisfied and the performance of test actions does not result. In some cases, a test condition attribute is a set of queries for accessing parts of an XML document, such as, for example, queries in the XML Path Language ("XPath"). In other cases, a test condition attribute is an algebraic expression included in an XML string.

A test frequency represents the chance of performing a test action after a condition is satisfied. A test frequency attribute can be configured such that a test action is always performed, is performed randomly, or is performed a percentage of the time, when a condition is satisfied.

A test action represents an action that is performed by a message processor to cause one or more messaging operations to affect one or more messages in a specified manner. In some cases, a test action is performed to simulate a defect in a message. For example, a message processor may append and remove information from a message so as to randomly garble some portion of the message or tamper with a signed portion of a message.

Table 1 shows a list of test actions and the results of performing the test action on a message(s). The list of tests and results included in Table 1 are illustrative only. It would be apparent to one skilled in the art, after having reviewed this description, that a wide variety of test actions may be used to cause a wide variety of results when implementing the principles of the present invention.

TABLE 1

| Test Action | Result of Performing Test Action |
| --- | --- |
| Garble | Randomly garble some portion of the message |
| Tamper | Randomly tamper with a portion of the message that is signed |
| Reorder | Randomly re-order messages that are sequenced and shipped in parts |
| Drop | Randomly drop messages |
| Replay | Randomly replay messages |
| Compliance | Check messages for compliance with industry standards |
| Propagate | Propagate testing settings to messages that follow on from this message |
| Deterministic | When routing messages to a farm or cluster, "affinitize" the routing to a particular message processor |
| Random | When routing messages to a farm or cluster, do not affinitize or be deterministic |
| ExtraHops | When routing a message take random or specified number of extra hops |
| Loop | When routing messages, randomly cause an infinite loop |
| Bloat | Make a message much larger, up to specified amounts |
| Time | Dispatch a message at a specified time |
| Record | Record messages and responses |
| Playback | Playback responses to recognized incoming messages |
| Validate | Initiate recorded messages and validate the response |
| Delay | Provide delayed replay of messages and responses |
| Schedule | Dispatch sets of messages at specified time intervals |
| Local | Test locale-specific conditions |
| Activity | Specify a particular processing activity to happen at a specified time |

In some embodiments, a testing agent contained in message router 230 monitors messages that are received and/or initiated at message router 230. In response to certain attach conditions being satisfied (e.g. receiving message 263), the testing agent causes test information to be inserted into message 261. Attach conditions may include, for example, that it be a specified time of day or day of the week, that a message processor associated with the testing agent be experiencing specified load conditions, that the testing agent receive a message that has taken a specified number of hops, or that a message matches a specific pattern.

In other embodiments, the testing agent allows the test initiator 220 to intercept the message 261. For example, the testing agent may modify routing information included in the header portion of message 261 to cause message 262 to be sent to test initiator 220 via logical communication link 272. In that case, message 262 may be essentially identical to message 261. Test initiator 220 then accesses message 262 and inserts test information into message 262. Test initiator 220 may also modify routing information to route distributed application data contained in message 261 to its original destination. Test initiator 220 then sends message 263, which now includes the test information, to message router 230 via logical communication link 272.

The message 263, which has the same distributed application data in the body portion as message 261 had, is then routed to its originally designated destination message recipient (act 303). This can include routing a message to a message processor that is to perform a test indicating by the inserted test information. Thus, test information may "flow" with distributed application data to the message processor where a test action is to be performed.

In FIG. 2, this may include message router 230 routing message 264 to message recipient 250. Message 264 may include distributed application data that was contained in message 261 along with test information that was caused to be inserted by testing initiator 220. Message 264 may be routed from message router 230 to message router 240 via logical communication link 273 and then from message router 240 to message recipient 250 via logical communication link 274.

Figure 4:
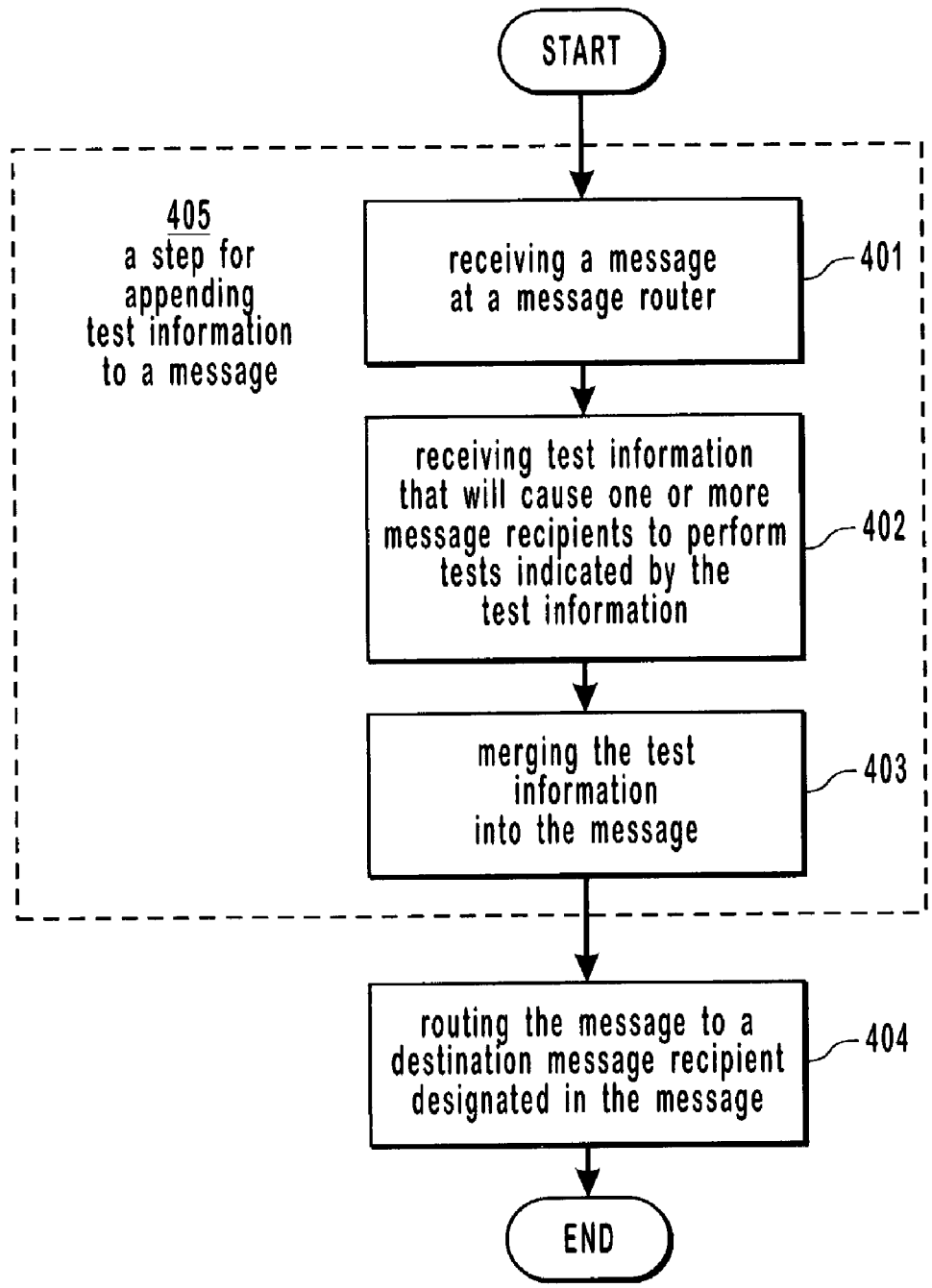
FIG. 4 is a flow diagram illustrating an example of a method for merging test information into a message.

FIG. 4 is a flow diagram illustrating an example of a method for inserting test information into a message. The method of FIG. 4 will be discussed with reference to the functional components of FIG. 2.

The method in FIG. 4 begins with a functional, result-oriented step for appending test information to a message (step 405). Step 405 may be performed so as to include the testing information along with distributed application data in the message. Step 405 may include any corresponding acts for accomplishing the result of causing test information to be appended to a message. However, in the illustrated example of FIG. 4, the step 405 includes a corresponding act of receiving a message at a message router (act 401). This can include message router 230 receiving message 261.

Step 405 includes a corresponding act of receiving test information that will cause one or more message recipients to perform tests indicated by the test information (act 402). This can include test initiator 220 initiating message 263, inserting test information into message 263, and then sending message 263 to message router 230 via logical communication link 272.

In one example embodiment, computer-readable media containing test information are maintained at a message processor. When a processed message matches specified attach conditions, test information is received from the computer-readable media. For example, message router 230 may maintain computer-readable media containing test information. When message 261 is received at message router 230, message router 230 analyzes the circumstances surrounding the reception of message 261 (e.g. current network conditions, time of day, address of a sending message processor, etc.) as well as the characteristics of message 261 (e.g. size, contents, header information, etc.). If specified attach conditions are satisfied (e.g. load conditions are above/below a specified threshold, message 261 is of a specified size, etc.) message router 230 receives test information from the maintained computer-readable media.

Specified conditions can include specified security requirements. For example, a message processor may need to be "authorized" to insert test information to a message. In embodiments that use SOAP envelopes, message processors that are authorized to insert test information may have a special license or a license with specific rights. A message processor attaches the license to a SOAP envelope and digitally signs any inserted test information to indicate that the message processor is authorized to insert the test information. Other message processors that receive the SOAP envelope process the digital signature to determine that the inserted test information is authorized test information. Different licenses or rights can be assigned to different message processors. More secure message processors, such as, for example, those on an intranet, can be given more rights than less secure processors, such as, for example, those on an extranet or the Internet.

Alternately, message 263 includes instructions, such as, for example, XML documents, that cause message router 230 to receive test information from computer-readable media maintained at message router 230. Instructions can be express instructions that cause message router 230 to receive test information from computer-readable media irrespective of any attach conditions.

Step 405 includes a corresponding act of merging the test information into the message (act 403). When a message that includes test information is received from a test initiator, a message router can access the test information included in the message. For example, message router 230 can access test information that was inserted into message 263 by test initiator 220. Message router 230 "propagates" the test information from message 263 to message 261. That is, message router 230 extracts the test information from message 263 and appends the test information to message 261. When appending test information to a message, message router 230 can merge test information into an existing test header of a message or can merge a new test header into a message. Likewise, message router 230 can merge test information that was received from a configuration file. Merging test information into existing messages (e.g. those already including distributed application data) allows test information to be expressed without affecting operation a distributed application.

The message is routed to a destination message recipient designated in the message (act 404). This can include routing a message to a message processor that is to perform a test indicating by the inserted test information.

Figure 5:
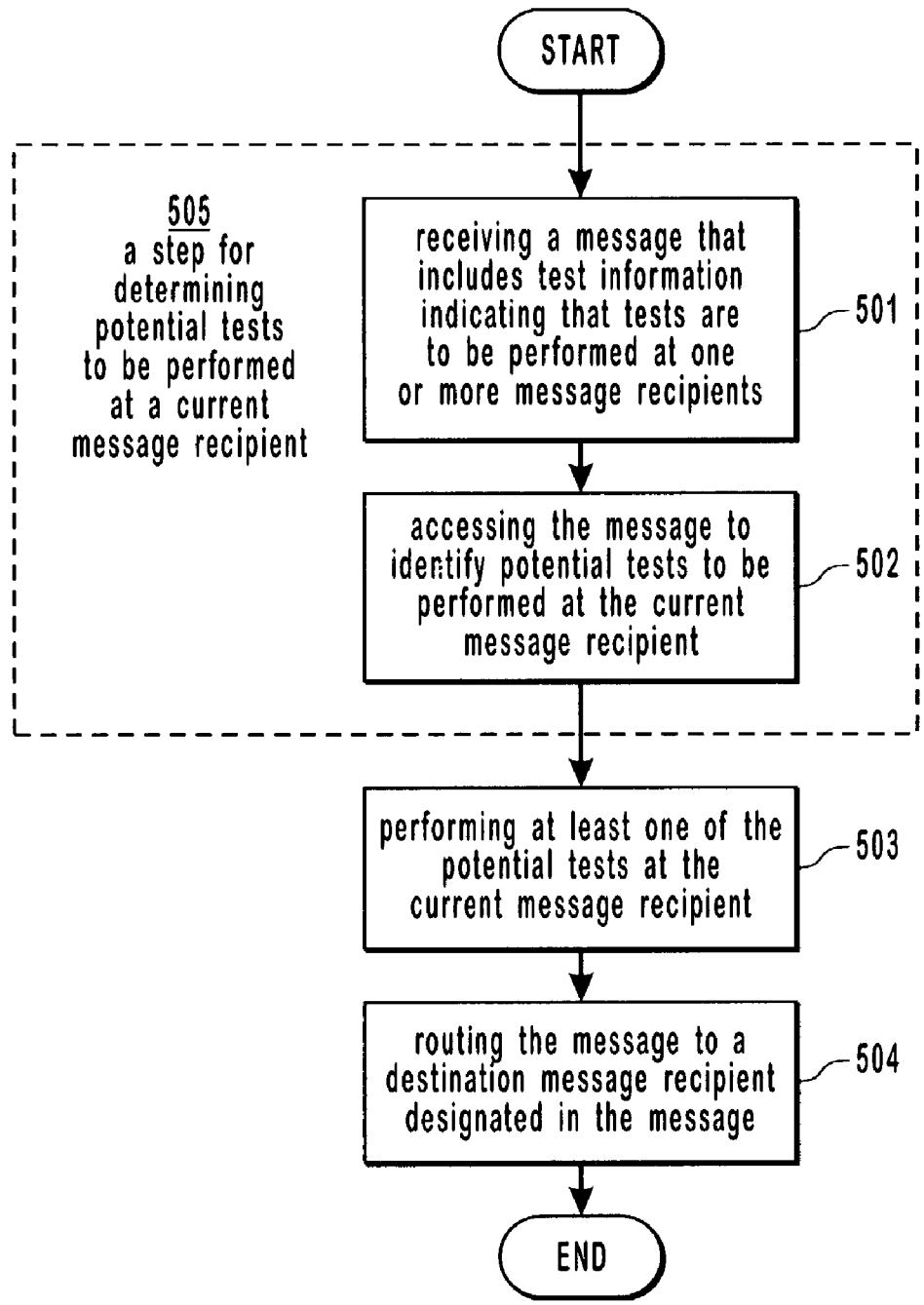
FIG. 5 is a flow diagram illustrating an example of a method for performing testing actions at a message processor.

FIG. 5 is a flow diagram illustrating an example of a method for performing a test action at a message processor. The method of FIG. 5 will be discussed with reference to the functional components of FIG. 2.

The method in FIG. 5 begins with a functional, result-oriented step for determining potential tests to be performed at a current message recipient (step 505). Step 505 may include any corresponding acts for accomplishing the result of determining potential tests that are to be performed.

However, in the illustrated example of FIG. 5, step 505 includes a corresponding act of receiving a message that includes test information indicating tests are to be performed at one or more message recipients (act 501).

This includes message recipient 250 receiving message 264. Message 264 may be a message that includes distributed application data along with test information indicating tests that are to be performed on the distributed application data included in message 264.

Step 505 includes a corresponding act of accessing the message to identify potential tests to be performed at the current message recipient (act 502). For example, message recipient 250 can access message 264 to identify tests to be performed at message recipient 250. This includes identifying test information that is associated with message recipient 250. In some cases, a testing agent contained in a message processor processes test headers contained in a message. For example, a testing agent contained in message recipient 250 can process test condition attributes and test frequency attributes of message 264 to identify tests associated with message recipient 250. Message recipient 250 can also verify security requirements, such as, for example, digital signatures, to determine that inserted test information is authorized test information. A message processor or testing agent may invoke instructions, applets, or scripts to cause testing information to be identified.

Step 505 includes a corresponding act of performing at least one of the potential tests at the current message recipient (act 503). Performing a test may include message recipient 250 performing any of the test actions included in Table 1. It should be understood that the test actions illustrated in Table 1 are merely examples. It would be apparent to one skilled in the art, after having reviewed this description, that a wide variety of tests may be performed when implementing the principles of the present invention.

The message is routed to a message processor designated in the message (act 504). It may be that message 264 includes testing information for tests that are to be performed at other message recipients in addition to message recipient 264. As such, message 264 is routed to one of these additional message recipients.

However, it may also be that a message is routed back to a message initiator. Message recipient 250 may initiate message 265 and then route message 265 to message router 230. Message 265 may be initiated when a portion of a distributed application running at message recipient 250 attempts to communicate with a portion of the distributed application running at message initiator 210. Message 265 can include distributed application data that is to be returned to message initiator 210, as well as information indicative of the results of any tests that were performed at message recipient 250. Message router 230 causes testing result data to be routed to test initiator 220. Testing result data can be included in message 262 and sent from message router 230 to test initiator 220 via logical communication link 272. Message router 230 causes distributed application data to be routed to message initiator 210. Distributed application data can be included in message 266 and sent from message router 230 to message initiator 210 via logical communication link 210.

When a message processor receives a message containing distributed application data that has been affected by a performed test, the message processor may interpret the message as being a defective message. For example, when a test action is performed to garble a message, a message processor may interpret the message as being garbled due to an error during transmission. Thus, a tester can simulate defects in distributed application data to determine how portions of a distributed application react to different types of defects.

In some embodiments, one or more message processors are configured to track when test actions have been performed and record this information in a database. Each message processor can record data associated with performed test actions to individual databases or to one centralized database. Data can be analyzed to determine potential testing configurations that have not been covered. Data associated with performed tests can be used as input to testing agents maintained at message processors to configure test information that will be inserted/merged into messages. Thus, in some cases, distributed applications are tested in a "closed loop" environment where output from previous tests is used as input to configure future tests.

In some embodiments, a test "orchestrator" (e.g. an appropriately configured message processor) coordinates the actions of a plurality of message processors. The test orchestrator causes each message processor included in the plurality to insert test information into different messages and/or to perform tests. A test orchestrator can cause message processors in insert test information or perform tests taking into consideration specific distributed applications, specific load conditions, specific distributed application data, or specific timing patterns. A timing pattern can be used to cause one or more configured message processors to route specified messages at specified time intervals. For example, configured message processors can send a "burst" of messages every ten seconds to provoke packet collisions in a systematic manner.

In some embodiments, a distributed application is tested across a plurality of distrusting but cooperative message processors. Different portions of a distributed application can be managed by different entities, such as, for example, different individuals or corporations. Each entity may cooperate with other entities during execution of the distributed application. For example, a user may initiate a purchase order application on the Website of a book selling entity. The purchase order application may draw money from a banking entity and use a shipping entity for delivery of a purchased book. Thus, the user, the book selling entity, the banking entity, and the shipping entity all cooperate during execution of the purchase order application.

However, for testing purposes each of these entities may not trust one another. For example, it may be undesirable to allow the user to test portions of the purchase order application that are managed by the book selling entity and undesirable to allow the book selling entity to test portions of the purchase order application that are managed by the banking entity. Express rules can be established to control the testing information an entity can attach to a message. Thus, the express rules can be used to restrict entities from testing portions of the purchase order application they do not manage.

In some embodiments, a trusted entity is trusted by all other entities to test all the portions of a distributed application. For example, the user, the book selling entity, the banking entity, and the shipping entity may all trust a testing entity that is authorized to test all portions of the purchase order application. Each of the other entities can give the testing entity authorization to attach testing information to messages that are processed by portions of the purchase order application that they manage. Different express rules can be established to control what applications a testing entity can test and when (e.g. day, time) they can test the applications.

No central authority is required to manage the express rules. Each individual entity controls a "Web of Trust" that includes trusted entities, what applications the trusted entities can access, and what operations trusted entities can perform on these applications. That is, each entity individual grants testing authorization to other entities without interfacing to a central authority. Since no central authority is required, an individual entity can more easily update a Web of Trust as the processing and administrative needs of the entity change.

By including test information in messages that are already in use by distributed applications, testing is essentially "built into" an existing messaging infrastructure. Thus, distributed application developers are relieved from having to design and implement specialized code to test distributed applications. Further, test information is extensible, thus allowing third parties to develop tests for future arising test situations. This may significantly reduce the labor and monetary costs of developing and testing distributed applications. Further, since test information is included in existing messages, testing a distributed application has a reduced impact on the performance of distributed systems associated with the distributed application.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes, which come within the meaning and range of equivalency of the claims, are to be embraced within their scope.

What is claimed and desired secured by United States letters patent is:

1. In a distributed system that includes at least a test initiator, a method for configuring tests that are to be performed at a message recipient, the method comprising the following:
   an act of accessing a message that originated at a message initiator;
   an act of modifying the message by inserting test information into the message, the test information including executable instructions for simulating a message defect in the modified message- that will cause one or more designated message recipients to process the modified message as if the modified message had the message defect; and
   an act of routing the modified message to a message processor designated in the modified message to determine how the message processor reacts to the simulated message defect.

2. The method as recited in claim 1, wherein the act of accessing a message that originated at a message initiator comprises the following:
   an act of accessing a Simple Object Access Protocol envelope.

3. The method as recited in claim 1, wherein the act of modifying the message by inserting test information into the message that will cause one or more designated message recipients to process the modified message as if the modified message had the message defect comprises the following:
   an act of inserting test information into a Simple Object Access Protocol envelope.

4. The method as recited in claim 1, wherein the act of modifying the message by inserting test information into the message that will cause one or more designated message recipients to process the modified message as if the modified message had the message defect comprises the following:
   an act of inserting test information into a message header associated with the message.

5. The method as recited in claim 1, wherein the act of modifying the message by inserting test information into the message that will cause one or more designated message recipients to process the modified message as if the modified message had the message defect comprises the following:
   an act of inserting a test header into the message.

6. The method as recited in claim 1, wherein the act of modifying the message by inserting test information into the message that will cause one or more designated message recipients to process the modified message as if the modified message had the message defect comprises the following:
   an act of inserting test information into a message that includes distributed application data, the test information for simulating a defect in the application data.

7. The method as recited in claim 1, wherein the act of modifying the message by inserting test information into the message that will cause one or more designated message recipients to process the modified message as if the modified message had the message defect comprises the following:
   an act of inserting a test condition into the message, the test condition indicating an event that is to occur for the executable instructions to be executed.

8. The method as recited in claim 1, wherein the act of modifying the message by inserting test information into the message that will cause one or more designated message recipients to process the modified message as if the modified message had the message defect comprises the following:
   an act of inserting a test action into the message, the test action represented by the executable instructions.

9. The method as recited in claim 1, wherein the act of modifying the message by inserting test information into the message that will cause one or more designated message recipients to process the modified message as if the modified message had the message defect comprises the following:
   an act of inserting an Extensible Markup Language document into the message.

10. The method as recited in claim 1, wherein the act of modifying the message by inserting test information into the message that will cause one or more designated message recipients to process the modified message as if the modified message had the message defect comprises the following:
    an act of embedding Java instructions in the message.

11. The method as recited in claim 1, wherein the act of modifying the message by inserting test information into the message that will cause one or more designated message recipients to process the modified message as if the modified message had the message defect perform tests comprises the following:
    an act of embedding Java derived language statements in the message.

12. The method as recited in claim 1, wherein the act of modifying the message by inserting test information into the message that will cause one or more designated message recipients to process the modified message as if the modified message had the message defect comprises the following:
    an act of embedding instructions in a message that was transferred in a Common Language Runtime environment.

13. The method as recited in claim 1, wherein the act of modifying the message by inserting test information into the message that will cause one or more designated message recipients to process the modified message as if the message had the modified message defect comprises the following:
    an act of inserting test information as a result of receiving feedback from a database.

14. The method as recited in claim 1, wherein the act of modifying the message by inserting test information into the message that will cause one or more designated message recipients to process the modified message as if the modified message had the message defect comprises the following:
an act of a trusted entity inserting test information that will cause a message recipient not managed by the trusted entity to process the modified message as if the modified message had the message defect.

15. The method as recited in claim 1, wherein the act of modifying the message by inserting test information into the message that will cause one or more designated message recipients to process the modified message as if the modified message had the message defect comprises the following:
an act of a license authorizing the insertion of test information that will cause a designated message recipient to process the modified message as if the modified message had the message defect.

16. In a distributed system that includes at least a message router, a method for configuring tests that are to be performed at a message recipient, the method comprising the following:
an act of receiving a first message at the message router;
an act of receiving test information, the test information including executable instructions for simulating a message defect that will cause one or more designated message recipients to process a message that includes the executable instructions as if the message had the message defect;
an act of modifying the first message by merging the test information into the first message; and
an act of routing the modified message to a message processor designated in the modified message to determine how the message processor reacts to the simulated message defect.

17. The method as recited in claim 16, wherein the act of receiving a first message at the message router comprises the following:
an act of receiving a Simple Object Access Protocol envelope.

18. The method as recited in claim 16, wherein the act of receiving a first message at the message router comprises the following:
an act of receiving a message that was transported using a Remote Method Invocation protocol.

19. The method as recited in claim 16, wherein the act of receiving a first message at the message router comprises the following:
an act of receiving a first message that includes distributed application data.

20. The method as recited in claim 16 , wherein the act of receiving test information comprises the following:
an act of receiving a second message that includes the test information.

21. The method as recited in claim 16, wherein the act of receiving test information comprises the following:
an act of receiving a second message including instructions that represent test information that is to be received.

22. The method as recited in claim 16, wherein the act of receiving test information comprises the following:
an act of receiving test information from a one or more computer-readable media associated with the message router.

23. The method as recited in claim 16, wherein the act of receiving test information comprises the following:
an act of receiving a test header.

24. The method as recited in claim 16, wherein the act of receiving test information comprises the following:
an act of a testing agent receiving test information as a result of an attach condition being satisfied.

25. The method as recited in claim 16, wherein the act of receiving test information comprises the following:
an act of a receiving test information that was authorized by a license agreement.

26. The method as recited in claim 16, wherein the act of receiving test information comprises the following:
an act of a receiving test information at a first entity that is trusted to test a second entity.

27. The method as recited in claim 16, wherein the act of modifying the first message by merging the test information into the first message comprises the following:
an act of propagating test information from a second message into the first message.

28. The method as recited in claim 16, wherein the act of modifying the first message by merging the test information into the first message comprises the following:
an act of merging test information from a configuration file into the first message.

29. The method as recited in claim 16, wherein the act of modifying the first message by merging the test information into the first message comprises the following:
an act of merging a test header into the first message.

30. The method as recited in claim 16, wherein the act of modifying the first message by merging the test information into the first message comprises the following:
an act of merging a test condition into the first message, the test condition indicating an event that is to occur for the executable instructions to be executed.

31. The method as recited in claim 16, wherein the act of modifying the first message by merging the test information into the first message comprises the following:
an act of merging a test action into the first message, the test action represented by the executable instructions.

32. The method as recited in claim 16, wherein the act of modifying the first message by merging the test information into the first message comprises the following:
an act of a testing agent merging test information into the first message as a result of an attach condition being satisfied.

33. The method as recited in claim 16, wherein the act of modifying the first message by merging the test information into the first message comprises the following:
an act of a merging test information that was authorized by a license agreement.

34. The method as recited in claim 16, wherein the act of modifying the first message by merging the test information into the first message comprises the following:
an act of a trusted entity merging testing information that will test a portion of a distributed application that is not managed by the trusted entity.

35. In a distributed system that includes at least a current message recipient, a method for performing a test at the current message recipient, the method comprising the following:
an act of receiving a message that includes test information, the test information including executable instructions for simulating a message defect in the message that will cause one or more designated message recipients to process the message as if the message had the message defect;
an act of accessing the message to identify potential executable instructions to be executed at the current message recipient to simulate the message defect;

an act of executing at least one executable instruction at the current message recipient to simulate the message defect to determine how the current message recipient reacts to the simulated message defect; and an act of routing the message to a message processor designated in the message.

36. The method as recited in claim 35, wherein the act of receiving a message that includes test information comprises the following:

an act of receiving a Simple Object Access Protocol envelope.

37. The method as recited in claim 35, wherein the act of receiving a message that includes test information comprises the following:

an act of receiving a message that includes distributed application data along with test information.

38. The method as recited in claim 35, wherein the act of receiving a message that includes test information comprises the following:

an act of receiving a message that includes embedded Java instructions.

39. The method as recited in claim 35, wherein the act of accessing the message to identify potential executable instructions to be executed_at the current message recipient comprises the following:

an act of accessing the message to identify test headers included in the message.

40. The method as recited in claim 35, wherein the act of accessing the message to identify potential executable instructions to be executed at the current message recipient comprises the following:

an act of accessing the message to identify test information associated with the current message recipient.

41. The method as recited in claim 35, wherein the act of accessing the message to identify potential executable instructions to be executed_at the current message recipient comprises the following:

an act of invoking embedded Java instructions to identify test information associated with the current message recipient.

42. The method as recited in claim 35, wherein the act of accessing the message to identify potential executable instructions to be executed_at the current message recipient comprises the following:

an act of invoking embedded Java derived language statements to identify test information associated with the current message recipient.

43. The method as recited in claim 35, wherein the act of accessing the message to identify potential executable instructions to be executed_at the current message recipient comprises the following:

an act of invoking instructions included in a message that was transferred in a Common Language Runtime environment to identify test information associated with the current message recipient.

44. The method as recited in claim 35, wherein the act of executing at least one executable instruction at the current message recipient to simulate the message defect comprises the following:

an act of determining that a condition is satisfied.

45. The method as recited in claim 35, wherein the act of executing at least one executable instruction at the current message recipient to simulate the message defect comprises the following:

an act of performing a test action represented by the at least one executable instruction.

46. The method as recited in claim 35, wherein the act of executing at least one executable instruction at the current message recipient to simulate the message defect comprises the following:

an act of invoking at least one Java instruction.

47. The method as recited in claim 35, wherein the act of executing at least one executable instruction at the current message recipient to simulate the message defect comprises the following:

an act of invoking at least one Java derived language statement.

48. The method as recited in claim 35, wherein the act of executing at least one executable instruction at the current message recipient to simulate the message defect comprises the following:

an act of invoking at least one instructions included in a message that was transferred in a Common Language Runtime environment.

49. The method as recited in claim 35, wherein the act of routing the message to a message processor designated in the message comprises the following:

an act of routing the message to a test initiator.

50. The method as recited in claim 35, wherein the act of routing the message to a message processor designated in the message comprises the following:

an act of routing the message to a message processor that tracks the performance of tests.

51. The method as recited in claim 35, further comprising:

an act of inserting test results, which were generated as a result of executing the at least one executable instruction, into the message.

52. The method as recited in claim 35, further comprising:

an act of inserting test results, which were generated as a result of executing the at least one executable instruction, into a second message.

53. The method as recited in claim 52, further comprising:

an act of routing the second message to a test initiator.

54. The method as recited in claim 35, further comprising:

an act of storing test results, which were generated as a result of executing the at least one executable instruction, in a database.

55. The method as recited in claim 35, further comprising:

an act of a timing condition associated with at least one of executable instructions_being satisfied.

56. A computer program product for use in a distributed system that includes at least a test initiator, the computer program product for implementing a method for configuring tests that are to be performed at a message recipient, the computer program product comprising the following:

one or more physical storage media carrying computer-executable instructions, that when executed at the test initiator, cause the test initiator to perform the method, including:

accessing a message that originated at a message initiator;

modifying the message by inserting test information into the message, the test information including executable instructions for simulating a message defect in the modified message that will cause one or more designated message recipients to process the modified message as if the modified message had the message defect; and routing the modified message to a message processor designated in the modified message to determine how the message processor reacts to the simulated message defect.

57. The computer program product as recited claim 56, wherein the one or more physical storage media are system memory.

58. A computer program product for use in a distributed system that includes at least a message router, the computer program product for implementing a method for configuring tests that are to be performed at a message recipient, the computer program product comprising the following:
one or more physical storage media carrying computer-executable instructions, that when executed at the message router, cause the message router to perform the method, including:
receiving a first message;
receiving test information, the test information including executable instructions for simulating a message defect that will cause one or more designated message recipients to process a message that includes the executable instructions as if the message had the message defect;
modifying the first message by merging the test information into the first message; and
routing the modified message to a message processor designated in the modified message to determine how the message processor reacts to the simulated message defect.

59. The computer program product as recited claim 58, wherein the one or more physical storage media include system memory.

60. A computer program product for use in a distributed system that includes at least a current message recipient, the computer program product for implementing a method for performing a test action, the computer program product comprising the following:
one or more physical storage media carrying computer-executable instructions, that when executed at the current message recipient, cause the current message recipient to perform the method, including:
receiving a message that includes test information, the test information including executable instructions for simulating a message defect in the message that will cause one or more designated message recipients to process the message as if the message had the message defect;
accessing the message to identify potential executable instructions to be executed at the current message recipient to simulate the message defect to determine how the current message recipient reacts to the simulated message defect;
executing at least one executable instruction at the current message recipient to simulate the message defect; and
routing the message to a message processor designated in the message.

61. The computer program product as recited claim 60, wherein the one or more physical storage media include system memory.

62. A computer network comprising the following:
a message initiator configured to initiate a message that includes distributed application data; and
a test initiator that is network connectable to the message initiator and configured to access the message and modify the message by inserting test information into the message for simulating a message defect in the modified message, without affecting the distributed application data, that will cause one or more designated message recipients to process the modified message as if the modified message had the message defect to determine how the one or more message designated recipients react to the simulated message defect.

63. A computer network comprising the following:
a message router configured to route a message that includes distributed application data and test information, the test information including executable instructions for simulating a message defect in the message that will cause one or more designated message recipients to process the message as if the message had the message defect to determine how designated message recipients react to the simulated message defect; and
a message recipient that is network connectable to the message router and configured to receive the message, accessing the message to identify potential executable instructions to be executed, and execute at least one executable instruction to simulate the message defect.

64. In a distributed system that includes at least a test orchestrator, a method for managing tests comprising the following:
an act of monitoring conditions of the distributed system;
an act of causing a first one or more message processors to modify messages by inserting test information into messages based on the monitored conditions, the test information including executable instructions for simulating a message defect in the modified messages that will cause one or more designated message recipients to process the modified messages as if the modified messages had the message defect to determine how designated message recipients react to the simulated message defect; and
an act of causing the modified messages to be routed to a second one or more message processors where executable instructions included in the test information are to be executed to simulate the message defect.

* * * * *